Figure 1:
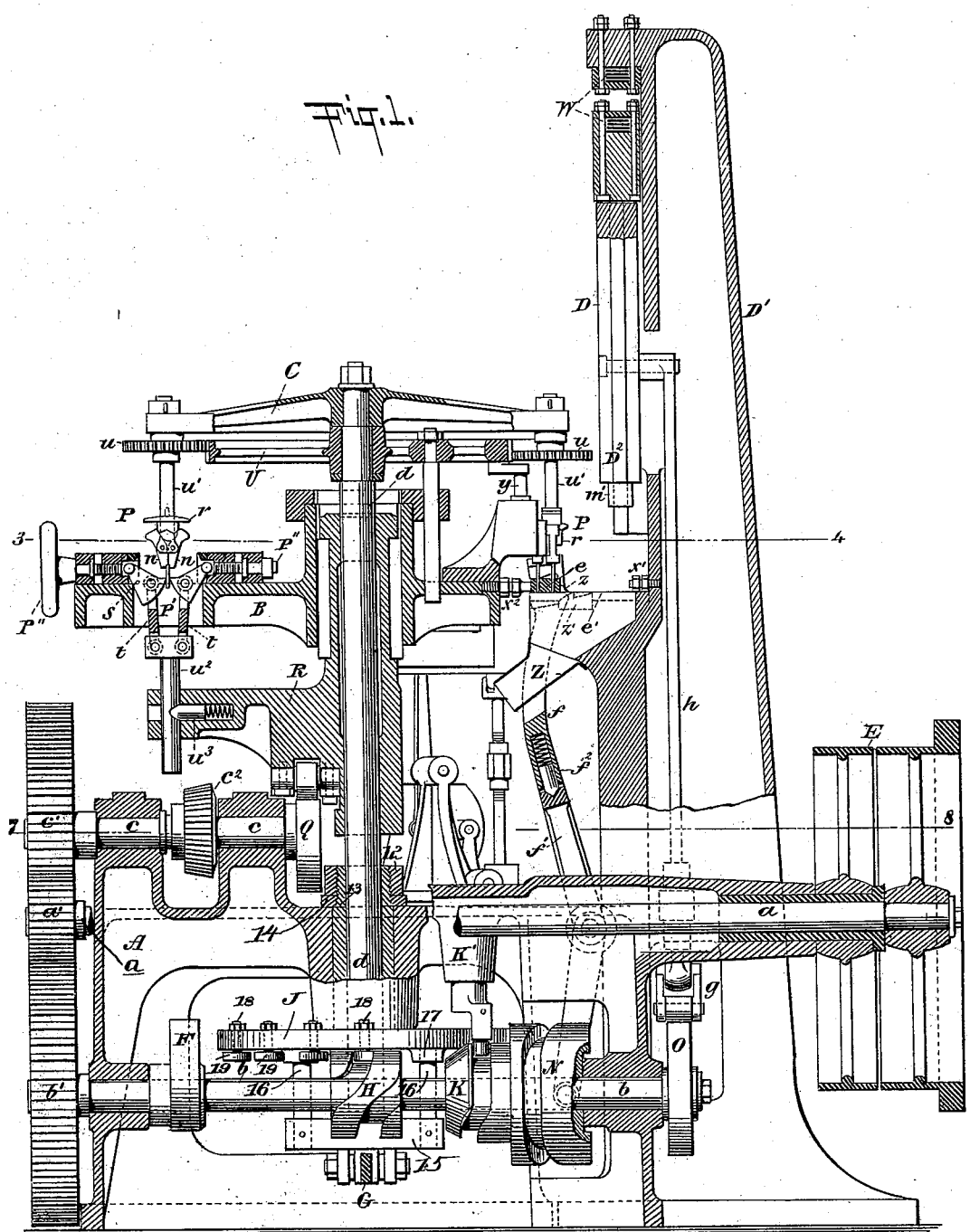

(No Model.) 7 Sheets—Sheet 1.
J. J. B. E. GENEZ.
APPARATUS FOR FORGING AND SHAPING SMALL ARTICLES OF METAL.
No. 507,800. Patented Oct. 31, 1893.

WITNESSES:
Gustave Dieterich
Victor Genez

INVENTOR
Joseph Jean Baptiste Emile Genez
BY
Wm O. Belt
ATTORNEY.

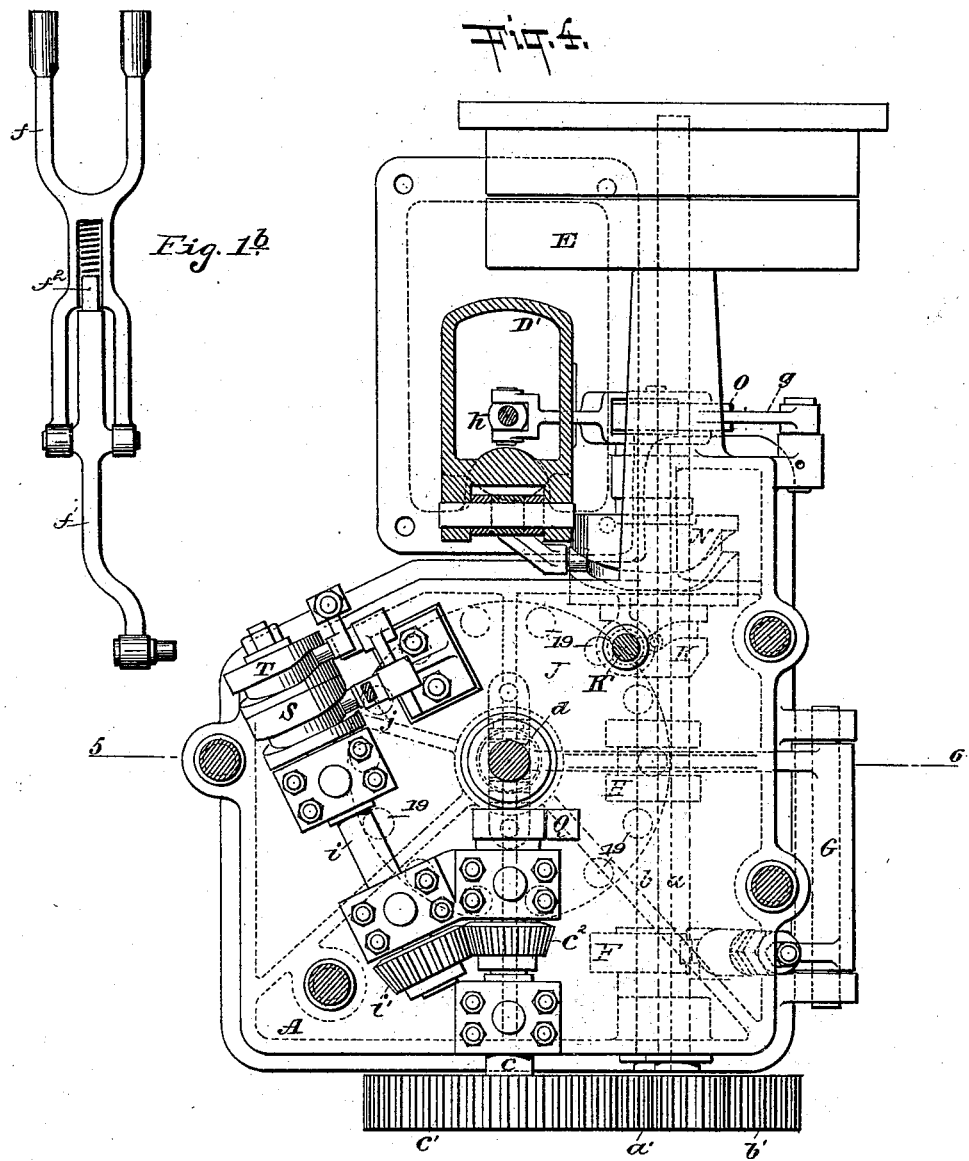

(No Model.) 7 Sheets—Sheet 3.
J. J. B. E. GENEZ.
APPARATUS FOR FORGING AND SHAPING SMALL ARTICLES OF METAL.
No. 507,800. Patented Oct. 31, 1893.
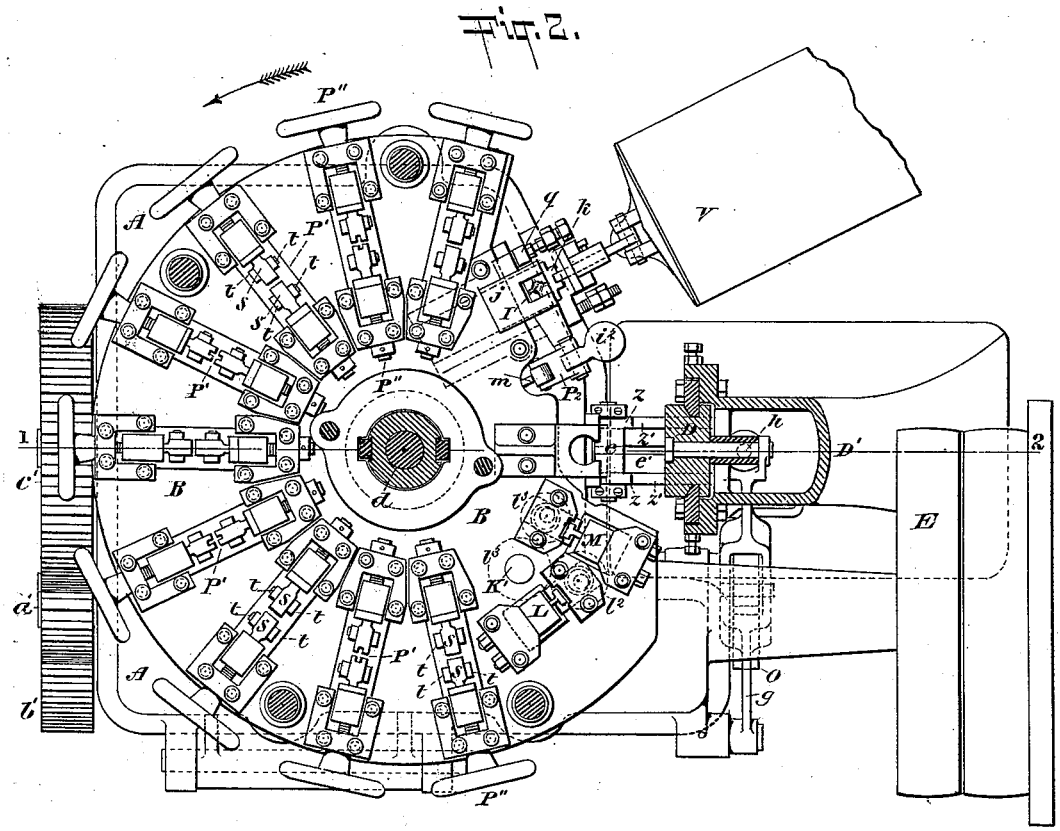
Fig. 2.
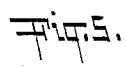
Fig. 5.
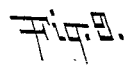
Fig. 9.
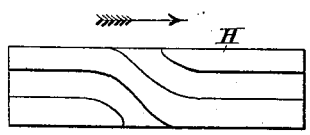
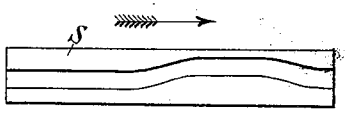
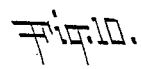
Fig. 10.
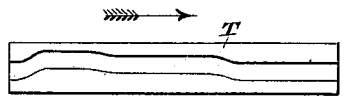
Fig. 11.
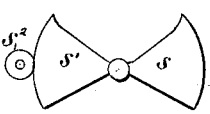
WITNESSES:
Gustave Dieterich
Victor Genez
INVENTOR
Joseph Jean Baptiste Emile Genez
BY
Wm. O. Belt
ATTORNEY.

(No Model.) 7 Sheets—Sheet 4.
J. J. B. E. GENEZ.
APPARATUS FOR FORGING AND SHAPING SMALL ARTICLES OF METAL.
No. 507,800. Patented Oct. 31, 1893.

WITNESSES:
Gustave Dieterich
Victor Genez

INVENTOR
Joseph Jean Baptiste Emile Genez
Wm. C. Belt
ATTORNEY.

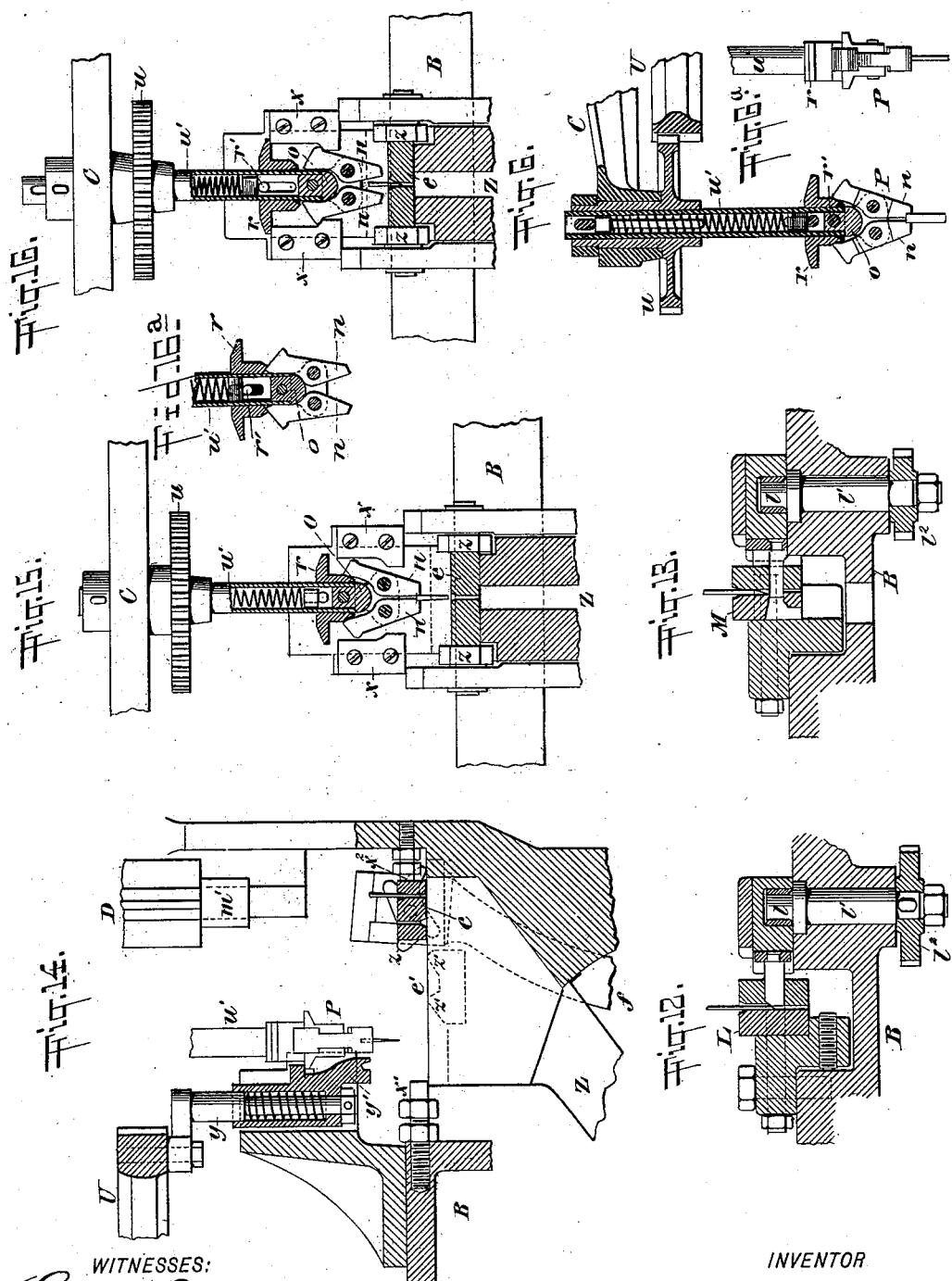

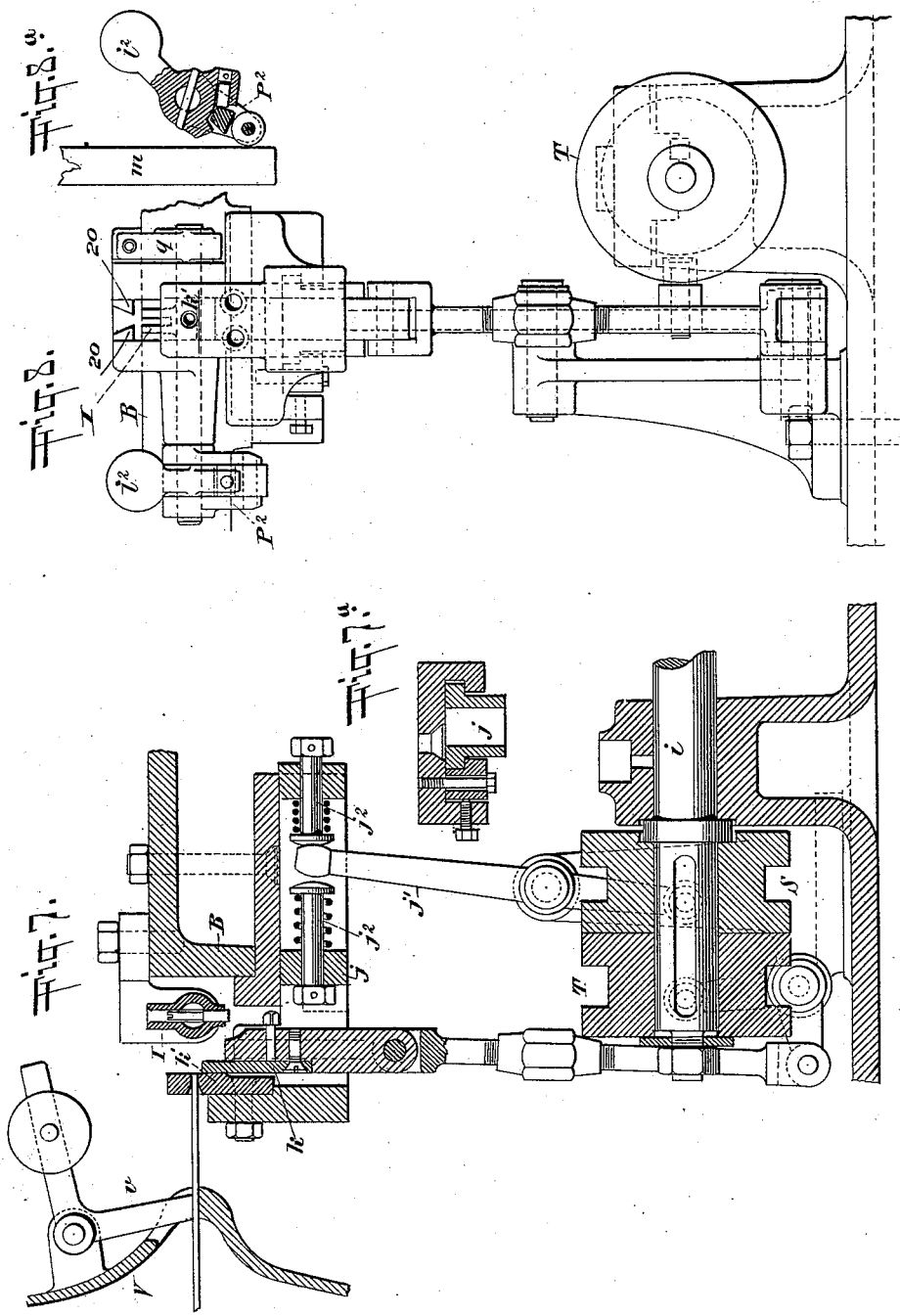

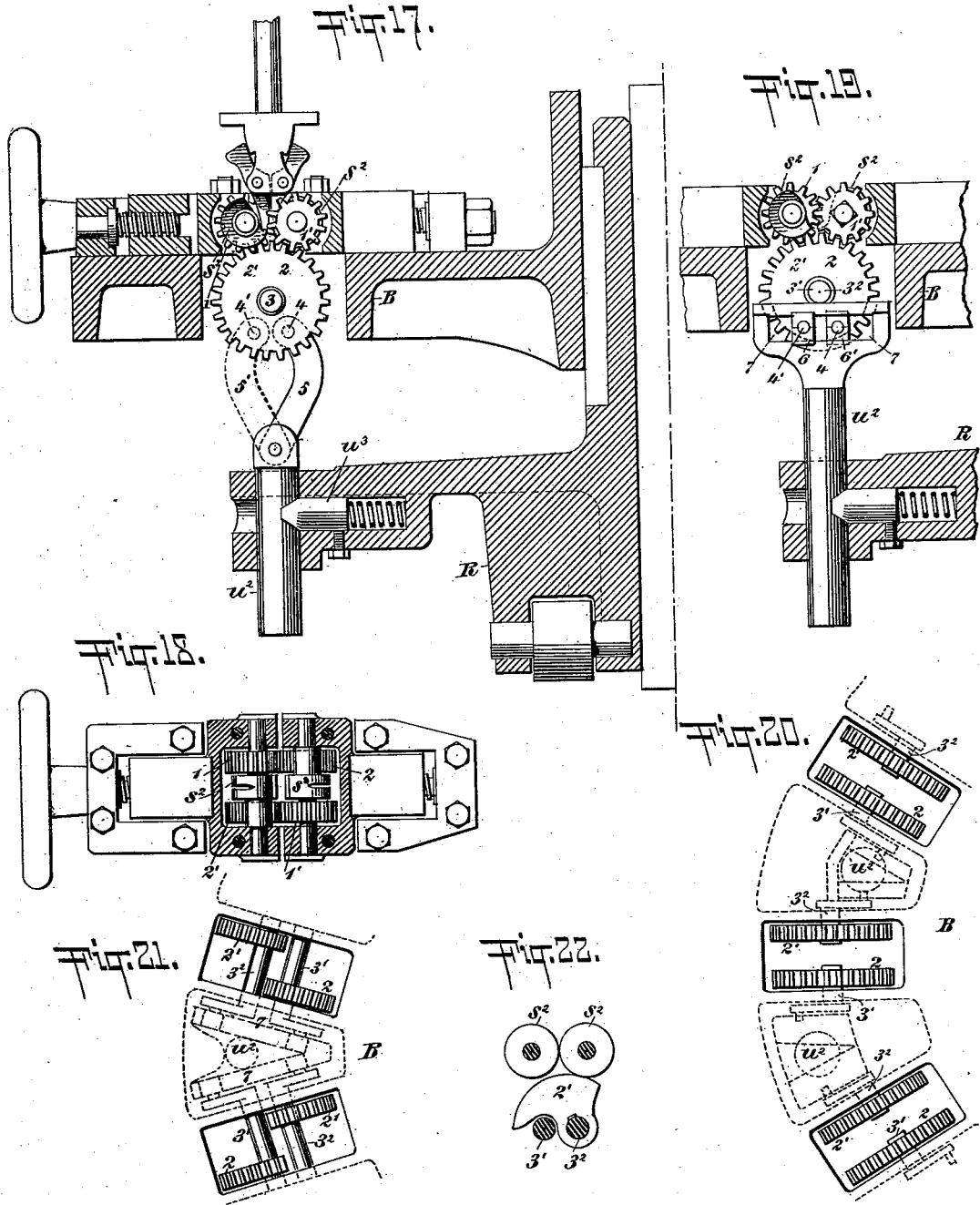

UNITED STATES PATENT OFFICE.

JOSEPH JEAN BAPTISTE EMILE GENEZ, OF LEVALLOIS-PERRET, FRANCE.

APPARATUS FOR FORGING AND SHAPING SMALL ARTICLES OF METAL.

SPECIFICATION forming part of Letters Patent No. 507,800, dated October 31, 1893.

Application filed February 24, 1893. Serial No. 463,543. (No model.) Patented in France October 3, 1892, No. 222,379; in Belgium November 30, 1892, No. 77,389; in Spain January 4, 1893, No. 2,657; in Italy February 3, 1893, No. 129; in Switzerland July 31, 1893, No. 6,509, and in England August 25, 1893, No. 21,563.

*To all whom it may concern:*

Be it known that I, JOSEPH JEAN BAPTISTE EMILE GENEZ, industrial, a citizen of the Republic of France, residing in Levallois-Perret, (Seine,) France, have invented an Apparatus for Forging and Shaping Small Articles of Metal, (for which I have obtained the following patents, viz: in France, No. 222,379, dated October 3, 1892; in Belgium, No. 77,389, dated November 30, 1892; in Spain, No. 2,657, dated January 4, 1893; in Italy, No. 129, dated February 3, 1893; in Switzerland, No. 6,509, dated July 31, 1893, and in Great Britain, No. 21,563, dated August 25, 1893,) of which the following is a specification.

This invention relates to machinery or apparatus for forging and shaping small articles of metal such as horseshoe and other nails, cramps, spikes, wood screws and the like requiring to be made of metal of such a nature and presenting such strength or resistance that they cannot be obtained of good quality by a stamping or cutting process but require to be made by a regular forging and shaping operation. This improved machinery has moreover the advantage of turning out the articles in a finished state and thus diminishing the number of manipulations required when a series of separate machines is employed to perform the different mechanical operations. The mechanism is characterized by the fact that the blanks or pieces of metal operated on are carried to the tools which successively shape them and which are arranged in a circle so that the blanks are enabled to travel in a circular path and if necessary partake at the same time of a rotary motion on their own axes in such a manner as to present all the sides or facets of the articles to the different tools which act upon them in succession. As a corollary to this general arrangement it is necessary to provide the following arrangement, viz: first, a special arrangement for feeding and cutting up the material to be worked the said material being in the form of a continuous bar either in a heated or cold condition; second, an arrangement for shaping by upsetting the metal; third, various safety appliances for preventing accidents during the working of the apparatus or machinery.

In order that my invention may be clearly understood I will now refer to the accompanying drawings which illustrate an example of a machine or apparatus according to my invention for forging and shaping horseshoe nails, the material being taken in the form of a continuous heated bar and the nails being delivered from the machine completely finished, the same letters and numerals of reference indicating the same parts in all the figures.

Figure 3:
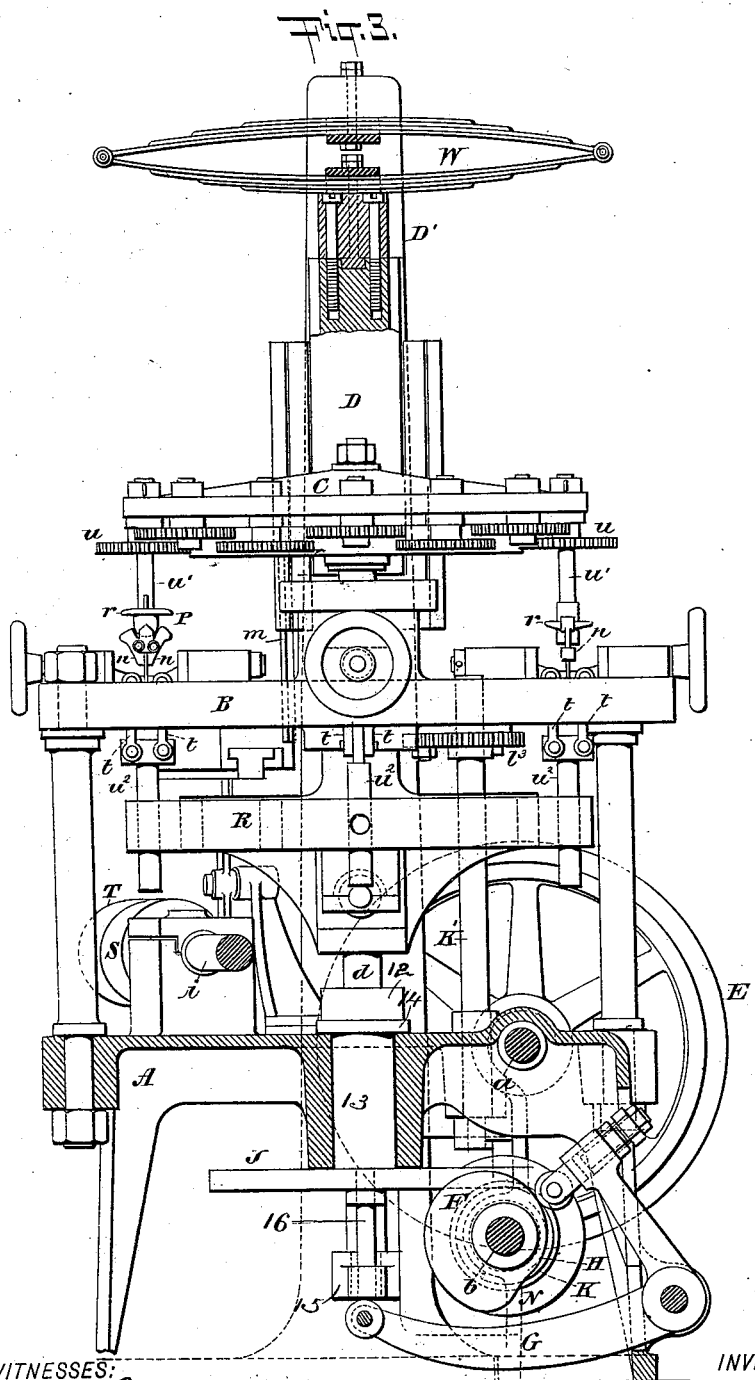

Figure 1 of the accompanying drawings is a vertical section showing the general arrangement of the apparatus, the section being taken on the line 1—2 Fig. 2. Figs. 1$^a$ and 1$^b$ are detailed views of the pin wheel J, and lever $f$ and segment $f'$, respectively. Fig. 2 is a horizontal section on the line 3—4 Fig. 1. Fig. 3 is a vertical section taken along the line 5—6 Fig. 4. Fig. 4 is a horizontal section along the line 7—8 Fig. 1. Figs. 5 to 16$^a$ show on a larger scale essential details of the apparatus. Figs. 17 to 22 show various arrangements of the rolling segments hereinafter described.

*General arrangement of the supports or framing.*—The machine comprises the following parts viz:—First. A lower frame A supporting all the moving parts and the driving shaft. Second. A circular table B supported by columns or pillars on the frame. On this table are arranged in a circle all the tools employed for forging and shaping the articles. Third. An upper movable plate C keyed on a vertical shaft $d$ passing through the frame and table. On this plate are supported radially in a circle and at equal distance apart grippers P which present the blanks to be worked to the tools fixed on the circular table. Fourth. A drop hammer or stamp D worked by a spring on a separate frame D'.

*General arrangement of the mechanism.*—The driving power imparted to the pulley E keyed onto the shaft $a$ is transmitted on the other side of the frame to two shafts $b$ and $c$ by means of the toothed wheels and pinions $a'$ $b'$ and $c'$. The shaft $b$ (Fig. 1) is provided with the following devices, viz:—first, a cam F imparting a vertically reciprocating movement by means of the bell crank lever G Fig. 3 to a vertical shaft $d$ carrying the upper or gripper plate C; second, a grooved cam H imparting to the said vertical shaft $d$ an intermittent rotary movement by means of a lantern wheel or pin wheel J; third, a cam K imparting motion to a punching or stamping tool L and to a cutting tool M; fourth, a cam N imparting a horizontal reciprocating motion to the matrix or anvil $e$ of the hammer D by means of a forked lever $f$, fifth, a snail cam O which raises the drop hammer or stamp D by means of a lever $g$ and connecting rod $h$. The shaft $c$ is provided with the following devices viz:—first, a cam Q giving vertical movement to the plate R which imparts movement as hereinafter described to all the rolls or rolling mechanism; second, a bevel pinion $c^2$ gearing with a pinion $i'$ imparting motion to an oblique shaft $i$, which oblique shaft $i$ (Fig. 4) is provided with two grooved cams viz:—first, a cam S imparting a reciprocating movement to a carriage $j$ carrying shears $k$, (Fig. 7;) second, a cam T operating the moving blade of the shears $k$.

The upper plate C carrying the grippers P being keyed onto the vertical shaft $d$ has a double or compound movemement, viz—First. An alternate upward and downward movement imparted to it by the cam F, which actuates the bell-crank lever G. The object of this movement is to engage the articles to be worked in the various tools on the circular table in the descent, and in the rising movement disengage the said articles after they have been shaped or forged in order to permit of the rotating movement of the plate or support. Second. An intermittent rotary motion imparted by the grooved cam H by means of the pin wheel or disk J which is provided at its circumference with a number of pins 18 provided with rollers 19 and corresponding to the number of grippers, four only of said rollers 19 being shown in Fig. 1 to avoid confusion of lines, (see Fig. 4.) The pin-wheel J is loose on shaft $d$ and is secured in the frame by the nut 12 screwed on the upper end of the sleeve 13 integral with the pin-wheel, and operating on a washer 14. On the lower end of shaft $d$ is a cross bar 15 supporting two uprights 16 which engage openings 17 in the pin-wheel when said shaft is raised by lever G, and thereby lock the pin-wheel to the shaft and cause the latter to rotate with the pin-wheel. The cam H rotates continuously and is provided on its circumference with a special groove presenting a straight portion terminated on each side in a curve so that when one of the rollers on the plate J is leaving the cam H the succeeding roller is engaged on the other side and continues the movement of the plate. The straight part of the cam corresponds with the stoppage of the rotary motion of the disk J and of the upper plate C. The rotary motion has the effect of carrying the blanks held by the grippers P from one tool to another. The stoppage corresponds with the period occupied by the action of the tools.

In addition to the two movements of the plate C the grippers partake of a movement peculiar to themselves and which has the effect of presenting the blanks to the tools on every side so as to enable them to be acted upon in several different directions. This movement is obtained by means of a large toothed wheel U (Fig. 1) placed upon the vertical shaft $d$ and ascending and descending with the latter but being incapable of rotating as it is guided by the circular table B. Pinions $u$ fixed upon the tubes $u'$ of the grippers travel round this wheel. The pinions forming part of the grippers are carried round with the upper plate C in its intermittent rotary motion and by rolling upon the fixed gear wheel U cause the grippers P to describe an angular rotary motion, the amplitude of which varies in accordance with the proportions of the wheel and pinions. By removing the teeth from a portion of the wheel U the movement may be suspended. The grippers P are composed of the following parts, viz: First, two small movable jointed jaws $n$ Fig. 6 upon a support $o$ attached to a vertical tube $u'$. Second. A sliding block $r$ provided with inclines and arranged to slide upon the tube $u'$, being guided by a pin $r'$ passing through the said tube. This block has two functions, viz., ($a$) to hold open the two jaws of the grippers by engaging with the faces of the upper ends of the jaws when they are close to the tubes, as shown in Fig. 16$^a$, and ($b$) to hold the grippers closed by entering between the tube and the upper ends of the jaws, the spring inside the tube being constantly pressed upon the block. Third. A helical spring placed inside the tube. This spring bears at its upper end against the key by which the tube is connected to the pinion imparting rotary motion to the gripper and at its lower extremity it bears upon the pin of the block $r$ which tightens the grip of the jaws upon the blank. This arrangement of the spring allows the gripper to move vertically the spring constantly tending to close the jaws. The grippers by which the blanks are presented to the different tools are open when they receive the blanks.

The opening and closing mechanism is hereinafter described.

When the gripper has closed upon the blank it does not open again until the performance of the last operation which consists in forming the head of the nail while the gripper is inserted into the matrix. The impressions and form of the jaws vary according to the shape and size of the articles to be produced.

*Details of the successive operations and of the tools.*—The operations to be performed in the manufacture of horse shoe nails in this machine are as follows:—first, the automatic feeding and cutting up of the rod into short lengths; second, causing the grippers to take hold of the cut lengths in order to present them to the tools; third, the gradual rolling action in both directions for the purpose of forging the shank of the nail; fourth, shaping the taper of the point and cutting out the said point; fifth, forming or stamping the head of the nail.

*Feeding and cutting.*—The rod or wire of suitable size corresponding to the nails to be made being supplied in the form of a continuous piece is drawn through a furnace placed at V Figs. 2, 7 and 8 in which it is heated to the required temperature. As it passes out of the furnace the rod is drawn under a clamping device $v$ which prevents it from moving backward and is guided into the opening in the fixed blade $k'$ of the shears. The carrier $j$ which slides under the circular table B receives a reciprocating movement from the cam S. A lever $j'$ which works it transmits the movement through flexible or yielding connections $j^2$, Figs. 4 and 7, which enable the carrier to be rocked in both directions by the aid of the parts $j^2$ which are capable of being adjusted according to the length of the blank to be cut. The carrier being brought into contact with the circular table and the movable cutter $k$ being depressed the cam S, Fig. 9, causes the carrier to move toward the furnace and the heated rod being prevented from moving back projects beyond the fixed cutter $k'$ to the extent required for the formation of the nail. The cam T Figs. 7 and 10, which works the movable cutter $k$ now causes the latter to advance and grip the rod between it and the cutter $k'$. The forward movement of the cutter then stops and the carrier $j$ returns and draws on the rod until it comes in contact with the circular table; directly it comes in contact, the movable cutter $k$ shears off the blank and then quickly clears the orifice in the fixed cutter in readiness for the succeeding operation which is performed as hereinbefore described.

*Introduction of the blank into the grippers.*—When the carrier $j$ returns against the circular table the extremity of the length of rod held between the two cutters of the shears $k\ k'$ is inserted into a cup I, Figs. 2, 7 and 8, which is held in a horizontal position by a counterweight $i^2$. The movable cutter completes the shearing action and the cup is raised in the direction of its rotation. The cut length projects beyond the edge of the cup to the extent required to enable it to be received by the jaws of the gripper. When the gripper, after its rotary motion, descends in order to lay hold of the blank, an arm $m$ (see Figs. 1, 2 and 3) attached to the large wheel U, which descends at the same time as the grippers, comes in contact with a lever $P^2$ fixed upon the axis of the cup I and causes it to describe a quarter of a revolution so as to present the cut rod to the gripper in a vertical position the said gripper having been previously opened automatically in the preceding operation as hereinafter explained. Two inclines 20 (Fig. 8) arranged upon the support of the cup I cause the jaws of the gripper to close automatically at the end of its descending movement, the jaws of the grippers being maintained closed by the sliding block or wedge $r$ acted on by the internal spring of the gripper, as shown in Fig. 15. The gripper then rises with the upper plate C in order to carry the blank to the succeeding tools. The cup I is brought back to the horizontal position by the counterweight $i^2$. The two positions (horizontal and vertical) of the cup are regulated by two movable stops on an arm $q$ fixed on the axis of the cup.

*Rolling.*—The blank held by the gripper is presented to the first tool. Upon the circular table are arranged several rolling apparatus P' Figs. 1 and 2 which roll the sides and edges of the blank alternately. Each apparatus is composed of two adjustable sliding supports fixed on the circular table and two segments $s$, or portions of cylinder $s^2$, and receives motion from the plate R which is moved in a vertical direction by the cam Q. The segments or portions of cylinders constituting a rolling apparatus are worked by two different arrangements hereinafter described according as they are of long or short radius. The segments $s$ of long radius, having a small angular motion, are moved by forked links $t$ connected to the rod $u^2$. The segments being depressed present, when the gripper is in the position represented in Fig. 1, an opening of about ten millimeters. The grippers in descending come in contact with the segments; the nail is then ready for rolling, and the plate R in ascending elevates the segments $s$, the upper part of which, having descended below the center line, presses the neck of the nail so as to free the head; the rolling action does not take place until the center line has been passed and continues until the segments have completed their stroke. The grippers then continue their ascending movement and after a rotation on their axes present the nail to the next rolling apparatus. During this time the plate R has carried the segments with it in its downward movement so as to place them in readiness for rolling the succeeding blank. The form of the segments corresponds with that of the nail. In the case of horse shoe nails the shank being tapered it suffices to make the outer part of the segments eccentric to an extent corresponding to half the difference in the thickness at opposite ends of the taper. In the case of other articles the form of the segments varies according to the nature of the article to be manufactured. The nails requiring to be rolled in both directions and all the rolling apparatus being arranged in the same direction it is necessary that at each rotation the grippers carrying the nails should describe one quarter or three quarters of a revolution according to the number of tools arranged upon the circular table. This angular displacement may vary according to the number of facets or surfaces on the articles to be produced. The flat part of the shank of the nail can be rolled by plain segments or cylinders but in order to roll the edges of the nail the rolling devices may be provided with grooves of suitable form according to the nature and shape of the nail to be manufactured. Each rolling apparatus is provided with two screws P'' enabling the two segments to be adjusted according to the thickness of the blanks and of the shanks of the nails to be rolled. In the case of rolling apparatus of short radius each portion of the cylinder $s^2$, Figs. 17 and 18, performing a considerable angular movement, is provided on one side with pinions 1, 1', made in one therewith or otherwise secured. The pinions do not gear together one being placed on the right and the other on the left side of the apparatus. Each pinion corresponds with separate wheels 2, 2' provided with teeth on the whole or part of their peripheries, being loose upon a shaft 3 attached to the plate B. The wheels 2, 2' are provided with studs 4, 4' engaging with links 5, 5' connected to a vertical rod $u^2$. The link 5' is represented by dotted lines being situated in front of the plane of the section. The links 5, 5' are hinged to the rod $u^2$ secured to the plate R, as hereinafter described. The wheel 2' is parallel with the wheel 2 but rotates in the opposite direction. The wheels 2, 2' may be fixed upon two separate shafts 3', $3^2$, Figs. 19 and 20 revolving in bearings attached to the plate B. These shafts may be in the same line (Figs. 19 and 20) or they may be parallel with one another (Fig. 21). In the latter case the wheels 2 and 2' are in the form of segments provided with recesses (Fig. 22) for the passage of the shafts 3', $3^2$. The links 5, 5' may be dispensed with by providing the studs 4, 4' with bearings 6, 6' (Fig. 19) sliding in a horizontal guide 7 provided in the upper horizontal part of a T-shaped head attached to the rod $u^2$. These rods $u^2$ whether provided with a guide 7 or with links 5 may be arranged between two adjacent rolling devices (Fig. 20) and act upon the pins of crank arms fixed upon the shaft 3', $3^2$ driving the adjacent wheels 2 and 2'. By means of this arrangement the number of rods $u^2$ may be reduced by one half (Fig. 21) as one rod is enabled to act upon the pins of four crank arms by means of a slide 7 or links 5. The object of these two arrangements is to enable the parts $u^2$, 4, 5 and 7 to be protected from the oxide dust resulting from the rolling operation by placing them underneath the solid part of the plate or table B.

The rolling segments with long angular movement arranged as hereinbefore described present the following advantages: First, a strictly uniform or equal movement is imparted to both of the rolling segments and at the same time the space between the rolls and the diameters are enabled to be adjusted within relatively wide limits either with a view to the employment of thicker or thinner blanks or for the purpose of compensating for wear without preventing them from gearing correctly with the driving wheels; second, pinions whose radii may differ from the mean radii of the segments are enabled to be employed; third, as a direct consequence of the preceding advantages pinions of a larger diameter are enabled to be employed and by these means it is very possible to employ pinions fixed upon the journals of the rolls or cylinders.

Fig. 11 illustrates an arrangement of segments for external reproduction which I employ in my improved machinery for making certain articles for which it would not be practicable to make the necesssary grooves in the segments. The segment $s$ is provided with a counterpart $s'$ having the profile of the piece of the article to be rolled; this counter part is constantly pressed against a roller $s^2$ working on a fixed pin and which causes the segment to perform the reproducing action in its rolling movement.

*Safety arrangement.*—The stem $u^2$ of the forked rods working the segments is provided with a safety arrangement for preventing accidents in working the rolling apparatus either during the ascent or descent. This arrangement is composed of a bolt $u^3$ (Fig. 1) provided with two inclined surfaces and acted on by a helical spring. The inclines on the end of this bolt engage with a corresponding recess in the cylindrical part of the rod $u^2$. When excessive pressure is produced between the rolling segments either during the ascent or during the descent the bolt yields and no movement being imparted to the segments they are protected from breakage. The proper proportion between the number of rolling apparatus of long radius and of rolling apparatus of short radius employed upon the table R must be regulated according to the nature of the articles to be manufactured.

*Stamping and cutting.*—Following the rolling apparatus there are provided upon the circular table B two other tools, viz: first, a stamping tool L and, second, a cutting tool M (for the point). These tools vary according to the size of the horseshoe nails. In all cases each of these tools is composed of a matrix and a die. The matrices are firmly secured to the table B but the dies are attached to slides working on the said table. These dies are moved by eccentrics $l$ fixed on shafts $l'$, provided underneath the table B with a pinion $l^2$ engaging with a wheel $l^3$ upon a vertical shaft K' (Figs. 1, 2 and 3) provided at its lower extremity with a crank arm carrying a roller engaging with the cam K which works the two stamping and cutting tools simultaneously.

*Stamping the head.*—The nail being rolled and pointed it has to be finished by forming the head. This is done by the apparatus D provided with a hammer $D^2$ carrying a counter matrix or die $m'$. This hammer is elevated by the snail cam O acting on a lever $g$ and connecting rod $h$ and is brought down by a blade spring W. The frame D' of the hammer is independent of the frame A of the machine to which it is attached by yielding or flexible connections. The blank being brought up by the gripper, the block $r$ or collar on the gripper comes in contact, in descending, with a fixed stop $x$ provided with internal inclines (Figs. 15 and 16) which compel the jaws to open and drop the blank into the recess or orifice of the matrix $e$. The jaws being open the sliding block $r$ impelled by the spring inside the tube engages with the jaws and holds them open (Fig. 16) in readiness for receiving a fresh blank. A flexible or yielding arm $y$ attached to the gear wheel U insures the opening and closing of the gripper, see Figs. 1 and 14. The hammer $D^2$ being situated outside the path of the grippers the matrix $e$ connected to the upper extremity of the lever $f$ worked by the cam N slides longitudinally upon a table $e'$ in order to bring the nail under the hammer. A special arrangement is provided for regulating the travel of the matrix between two adjustable stops $x'$ and $x^2$ (Fig. 1). This arrangement is composed of a segment $f'$ keyed upon the shaft of the forked lever $f$; this segment is provided with an angular notch engaging with a spring bolt $f^2$ inserted in the lever $f$. When the matrix $e$ comes in contact with the stop at the end of its stroke the bolt $f^2$ yields and allows the segment $f'$ to continue its movement, thus preventing any severe and sudden shock or jar to the matrix. When the matrix is in the proper position under the hammer $D^2$ the latter descends and forms the head of the nail after which the hammer immediately rises and the matrix $e$ returns in order to receive a fresh blank from the grippers. In returning the two ratchets $z$ keyed upon the matrix engage with two teeth $z'$ fixed on the guide and cause the matrix to turn over or describe half a revolution so as to present the second recess to the gripper which is ready to deposit a nail therein. The yielding arm $y$ which causes the gripper to descend is provided with a heel or projection $y'$ which drives out the formed nail at the same time as the gripper deposits a blank in the second recess. The nail driven out of the matrix falls into a chute Z of sheet metal which conducts it to a suitable receptacle outside the machine. This nail is completely finished. The last operation of stamping by striking is not performed unless the article to be produced has a projecting head; in certain cases it may be dispensed with altogether or another operation such as molding by pressure or with a rolling action may be substituted.

I claim as my invention—

1. In a machine for forging and shaping small metal articles, the cutting mechanism adapted to sever the blanks from a heated bar of metal, the rolling, stamping and cutting tools, a series of grippers, each of which is adapted to grasp a blank as it is severed from the bar and present the same successively to said tools, and the hammer, substantially as described.

2. In a machine for forging and shaping small metal articles, the combination with mechanism adapted to sever a blank from a heated bar of metal, the rolling, stamping and cutting tools, of a series of grippers adapted to grasp the blanks and present them successively to the forming tools, and means, substantially as described, for transferring the blank as it is severed from the bar into position to be grasped by the gripper, as set forth.

3. In a machine for forging and shaping small metal articles, a table having a series of rolling tools arranged thereon, and a movable plate above said table carrying a series of grippers adapted to receive the metal blanks and present them successively to the rolling tools to be acted on thereby, substantially as described.

4. In a machine for forging and shaping small metal articles, a table having a series of rolling tools arranged thereon, a movable plate above said table carrying a series of grippers adapted to receive the metal blanks and present them successively to the rolling tools to be acted on thereby, and means for partially rotating said grippers and blanks as they are presented to the tools, substantially as described.

5. In a machine for forging and shaping small metal articles, a stationary table having a series of rolling tools arranged thereon, a movable plate above said table, a series of depending grippers carried by the plate and adapted to receive the metal blanks, and means for revolving said plate to cause the grippers to advance and present the blanks successively to each forming tool, substantially as described.

6. In a machine for forging and shaping small metal articles, a stationary table having a series of rolling tools arranged thereon, a movable plate above said table carrying a series of grippers adapted to receive the metal blanks and present them successively to the forming tools, and mechanism for stamping and cutting the points of the blanks after they have passed through the rolling tools, substantially as described.

7. In a machine for forging and shaping small metal articles, a stationary table having a series of rolling tools arranged thereon, a movable plate above said table, a series of grippers carried by the plate and adapted to receive the metal blanks, and means for partially rotating each blank and presenting the same to each of said series of rolling tools in succession, substantially as described.

8. In a machine for forging and shaping small metal articles, the combination with a stationary table having a series of openings therein, a series of rolling tools arranged on said table, each tool comprising a pair of adjustable blocks secured oppositely on the table, the segments of the rolling tools pivoted to said blocks and adapted to operate in the openings in the table, a vertically movable rod arranged below each rolling tool and having link connections with the segments thereof, and means for moving said rods vertically to operate the tools, substantially as described.

9. In a machine for forging and shaping small metal articles, a stationary table having a series of rolling tools thereon, each tool comprising a pair of adjustable blocks arranged oppositely on the table, and the segments of the rolling tools pivoted to said blocks and operating in openings in the table, substantially as described.

10. In a machine for forging and shaping small metal articles, a movable plate carrying a series of grippers adapted to receive and hold the metal blanks while being rolled, a stationary table, a series of rolling tools arranged on said table, each tool comprising a pair of pivoted segments adapted to receive the suspended blank between them, and means, substantially as described, for operating said segments to roll the metal blank, as and for the purpose set forth.

11. In a machine for forging and shaping small metal articles, the rolling tools, each tool comprising a pair of segments adapted to grasp the blank, a movable rod $u^2$, the links connecting said rod and segments, and means for moving the rod vertically and operating the segments, substantially as described.

12. In a machine for forging and shaping small metal articles, the rolling tools, each tool comprising a pair of segments, a vertically movable plate arranged below said tools, the rods carried by said plate and having link connections with the segments, and means for moving said plate vertically to operate the segments, substantially as described.

13. In a machine for forging and shaping small metal articles, the combination with a stationary table having a series of rolling tools arranged thereon, of a vertically movable plate below said table and suitable connections between said plate and rolling tools whereby the latter are operated when the plate is moved vertically, substantially as described.

14. In a machine for forging and shaping small metal articles, the rolling tools comprising a pair of segments, the pinions rigid with said segments, the toothed wheels supported beneath said pinions and arranged in engagement therewith, and means for operating the wheels and pinions, substantially as and for the purpose set forth.

15. In a machine for forging and shaping small metal articles, the rolling tools, comprising a pair of segments, the pinions rigid with said segments, the toothed wheels arranged beneath the pinions and in engagement therewith, the rod $u^2$ and links connecting said rod and the wheels, and means for moving said rod vertically, substantially as and for the purpose set forth.

16. In a machine for forging and shaping small metal articles, the rolling tools, each comprising a pair of segments, a vertically movable plate arranged below the tools and means for operating the same, the rods carried by said plate, the links connecting the rods to the segments, and spring controlled bolts arranged in the plate and adapted to release the rods when excessive pressure is produced between the segments, substantially as and for the purpose set forth.

17. In a machine for forging and shaping small metal articles, a stationary table having a series of rolling tools arranged thereon, a movable plate above the table, and a series of depending grippers carried by said plate and adapted to receive the blanks and present them successively to the rolling tools substantially as described.

18. In a machine for forging and shaping small metal articles, a gripper comprising a tube or stem, a support arranged in the lower end of said tube, the jaws pivoted to said support and having free upper ends, and a sliding block arranged on the tube and adapted to engage with the faces of the upper ends of the jaws when they are close to the tube and hold the jaws open in a position to receive the blank, or clamp the jaws rigidly on the blank by entering between the tube and the upper ends of the jaws and forcing the latter away from the tube, as described.

19. In a machine for forging and shaping small metal articles, a series of grippers, each comprising a tube or stem, a support arranged in the lower end of the tube, the jaws pivoted on said support, a sliding block arranged on said tube and adapted to clamp the jaws upon the blank throughout the rolling operation, and the stops $x$ arranged to engage the block and release the jaws, substantially as and for the purpose described.

20. In a machine for forging and shaping small metal articles, a stationary table, a series of rolling tools arranged on the table, and a movable plate above said table carrying a series of depending grippers, said plate partaking of a vertical motion to adapt the grippers to grasp the blanks and present them to the rolling tools and also a rotary motion to advance the grippers successively to the several tools, substantially as described.

21. In a machine for forging and shaping small metal articles, the table having a series of rolling tools thereon, a plate arranged above the table, the grippers depending from said plate and carrying pinions, the vertical shaft supporting said plate and a gear wheel secured on said shaft and gearing with the pinions to partially rotate the grippers as they advance from one set of rolling tools to another, substantially as described.

22. In a machine for forging and shaping small metal articles, the table having a series of rolling tools arranged thereon, a movable plate above the table carrying a series of grippers, in combination with a pin wheel J and cam H for the purpose of imparting an intermittent rotary motion to the plate and grippers holding the blanks, thereby enabling the blanks to be transferred from one tool to another and allowing each tool sufficient time to act upon the blank, substantially as described.

23. In a machine for forging and shaping small metal articles, the combination of the rolling tools, the stamping and cutting mechanism comprising the matrices secured on the table B, the dies, the eccentrics $l$ supported on shafts $l'$ and adapted to operate the dies, and means for actuating said shafts, substantially as described.

24. In a machine for forging and shaping small metal articles, a table supporting the rolling tools, a movable carriage arranged beneath the table and having knives adapted to receive and cut the metal blanks, and mechanism, substantially as described, for automatically operating said carriage and knives.

25. In a machine for forging and shaping small metal articles, a table having a series of rolling tools thereon, the grippers supported above said table, a movable carriage arranged beneath the table and carrying knives adapted to engage a metal rod and sever a blank therefrom, and a cup I adapted to receive the blank and carry it into position to be grasped by the gripper, substantially as described.

26. In a machine for forging and shaping small metal articles, a table having a series of rolling tools thereon, the grippers supported above the table, a movable carriage arranged beneath the table, a fixed knife carried by said carriage and adapted to receive a metal bar, means for advancing said knife to grasp the bar, and a movable knife adapted to sever a blank from said bar, substantially as described.

27. In a machine for forging and shaping small metal articles, a table having a series of rolling tools thereon, the grippers supported above the table, a movable carriage arranged beneath the table, the knives adapted to grasp a metal bar and sever a blank therefrom, a rock shaft, a cup secured on said rock shaft and adapted to receive the blank and carry it up in position to be grasped by one of the grippers, and means for operating said shaft and cup, substantially as described.

28. In a machine for forging and shaping small metal articles, the combination with the table carrying the rolling tools, and the grippers, of a movable carriage arranged beneath the table, a fixed knife supported in said carriage, a movable knife, and the cams S, T, adapted to actuate said carriage and knife, substantially as and for the purpose described.

29. In a machine for forging and shaping small metal articles, the combination of a stationary table, a series of rolling tools arranged thereon, the stamping and cutting mechanism, a series of grippers adapted to grasp the blanks and present them successively to said tools and the stamping and cutting mechanism, and a hammer arranged at one side of said table and adapted to form a head on the blank and complete the article, substantially as described.

30. In a machine for forging and shaping small metal articles, the combination of a series of rolling tools, the stamping and cutting mechanism, and a series of depending grippers adapted to receive the blanks and having an intermittent advancing movement and a limited vertical movement to adapt them to present the blanks successively to said tools and mechanism, substantially as described.

31. In a machine for forging and shaping small metal articles, the combination with the rolling, stamping and cutting mechanism, of a hammer for forming a head on the blank, a matrix adapted to receive the blank and carry it into position under the hammer, and mechanism for operating the hammer and automatically discharging the finished article, substantially as described.

32. In a machine for forging and shaping small metal articles the combination with the rolling stamping and cutting tools, and means for successively presenting a blank thereto, of a hammer adapted to form a head on the article, and means for carrying the blank from the cutting tool to the hammer, comprising a lever, a matrix pivoted on said lever and having openings to receive the blanks, and suitable actuating mechanism, substantially as described.

33. In a machine for forging and shaping small metal articles, the mechanism for carrying the blank from the cutting tool to the hammer for forming the head, comprising a lever, a matrix pivoted at the upper end of the lever and having openings to receive the blanks, and the ratchets keyed on the matrix and adapted to engage with teeth $z'$ to turn the matrix, substantially as and for the purpose described.

34. In a machine for forging and shaping small metal articles, the combination with the matrix having openings to receive the blanks after having been rolled, stamped and cut, the gripper adapted to discharge the blank into one opening, and an arm having a yielding projection $y'$ arranged to drive a completed article from the other opening, substantially as described.

35. In a machine for forging and shaping small metal articles, the combination of a horizontal shaft having a forked lever $f$ thereon, the matrix pivotally secured on said lever and having openings to receive the blanks, means for discharging the finished article from the matrix, a segment $f'$ keyed on said shaft, and a spring bolt $f^2$ arranged in said forked lever and adapted to operate on the segment, substantially as described.

36. In a machine for forging and shaping small metal articles, the combination of the grippers, the matrix $e$, having openings therein, and the fixed stops $x$ having inclined inner edges adapted to engage the pivoted jaws of the grippers to open the same and release the blanks, substantially as described.

37. In a machine for forging and shaping small metal articles the combination of a forked lever $f$, secured on a horizontal shaft and carrying a matrix $e$, a segment $f'$ keyed on said shaft and having a notch in its free end, and a spring pressed bolt $f^2$ arranged in the lever $f$ and engaged with said notch in the segment, substantially as described.

38. In a machine for forging and shaping small metal articles, the frame, a horizontal power shaft journaled in said frame, a vertical shaft supporting a plate C, the grippers carried by said plate, a cam rigid on the power shaft, and a pin wheel or disk secured at the lower end of the vertical shaft and having a series of rollers adapted to engage with said cam and impart a rotary movement to the pin wheel and vertical shaft, substantially as and for the purpose set forth.

39. In a machine for forging and shaping small metal articles, the frame, the shafts $b, e$, journaled in the frame and geared together, a table rigid on the frame, the rolling tools arranged on said table, a movable plate beneath the table carrying rods connected with the rolling tools, and a cam rigid on the shaft $c$ and adapted to move said plate vertically to operate the rolling tools, substantially as described.

40. In a machine for forging and shaping small metal articles, the combination with a main frame, the horizontal shafts $b\ e$, suitably geared together, a vertical shaft and means for revolving and imparting a limited vertical movement thereto, of a stationary table supported on the frame and having the rolling tools arranged thereon, a plate secured on the vertical shaft above the table and carrying a series of grippers, another plate arranged below the table, the rods carried by said plate and connected with the rolling tools, and a cam rigid on the shaft $c$ adapted to elevate said table and cause the rolling tools to operate on the blanks held by said grippers, substantially as described.

In testimony whereof I have signed my name to this specification in the presence of two subscribing witnesses.

JOSEPH JEAN BAPTISTE EMILE GENEZ.

Witnesses:
LEON FRANCKEN,
ROBT. M. HOOPER.